United States Patent [19]
Yamada et al.

[11] Patent Number: 5,999,750
[45] Date of Patent: Dec. 7, 1999

[54] CAMERA

[75] Inventors: Hiroyuki Yamada, Hachioji; Manabu Ikeda, Machida, both of Japan

[73] Assignee: Olympus Optical Co., Ltd., Tokyo, Japan

[21] Appl. No.: 09/204,377

[22] Filed: Dec. 2, 1998

[30] Foreign Application Priority Data

Dec. 17, 1997 [JP] Japan .................................. 9-348098

[51] Int. Cl.⁶ .................................................. G03B 17/24
[52] U.S. Cl. .......................................... 396/176; 396/535
[58] Field of Search .................................. 396/176–178, 396/535, 541

[56] References Cited

U.S. PATENT DOCUMENTS 5,749,003  5/1998  Tanabe ..................................... 396/177
5,822,638  10/1998  Yoshida et al. .......................... 396/177

FOREIGN PATENT DOCUMENTS

8-160516   6/1996   Japan .
8-286242  11/1996   Japan .

*Primary Examiner*—David M. Gray
*Attorney, Agent, or Firm*—Louis Weinstein

[57] ABSTRACT

Disclosed is a camera comprising a camera main body composed of a plurality of units including at least a lens barrel unit, a spool chamber unit and a Patrone chamber unit, a strobe unit including a strobe light emitter which is movable to a light emission possible position where strobe light emitter projects from the camera main body and an accommodating position where it is accommodated in the camera main body and a drive mechanism supported by the spool chamber unit or the Patrone chamber unit and driving the strobe unit.

20 Claims, 6 Drawing Sheets

CAMERA

BACKGROUND OF THE INVENTION

1. Field of the Invention

The present invention relates to a camera, and more specifically, to a camera having a drive means for moving a strobe light emitter to a light emission possible position where the strobe light emitter projects from a camera main body and an accommodating position where it is accommodated in the camera main body.

2. Related background Art

Recently, in photographing equipment and the like such as cameras and so on (hereinafter, referred to as cameras) for taking photographs, there has been an increasing request for reducing the size and weight of the cameras as well as the design of the exterior member and the like of the cameras and the specification and the like of the various functions of the cameras -are frequently changed.

Further, materials such as plastic and the like have been widely used in place of, for example, metal materials which have been widely used as a material for constituting a camera main body.

Thus, there has been proposed and become commercially practical various types of technical means. According to the technical means, various members constituting a camera main body are arranged as units corresponding to the functions of the members and a plurality of the units are assembled to each other so that the camera main body can be effectively formed as well as the strength of the camera main body can be more improved.

For example, in the camera disclosed in Japanese Unexamined Patent Publication No. 8-160516, a camera main body is composed of a plurality of units such as a first block for forming a Patrone chamber, a second block for forming a spool chamber, a support unit for supporting a photographing lens barrel disposed on a front surface side between the first block and the second block, and the like. According to the arrangement, when stress is imposed on the camera, not only strength capable of maintaining the flatness of a film can be secured but also the design, specification and the like of the camera can be changed only by the modification of the design of some of the plurality of units.

On the other hand, small cameras with more improved portability have recently become pervasive in cameras which execute photographing and the like using a rolled light sensitive material. In these small cameras, cameras having a flash gun (hereinafter, referred to as a strobe unit) built therein for emitting flash as auxiliary illuminating light in photographing have become commercially practical.

In the cameras having the built-in strobe unit, there have been proposed and become commercially practical various types of cameras having a drive means for driving the flash light emitter (hereinafter, referred to as a strobe light emitter) of the strobe unit. The drive means is arranged such that when, for example, photographing is carried out, it moves the strobe light emitter to a light emission possible position where it is projected from a camera main body and when the camera is stored or carried, the drive unit moves the strobe light emitter to an accommodating position where it is accommodated in the camera main body.

For example, the moving device for moving a strobe light emitter disclosed in Japanese Unexamined Patent Publication No. 8-286242 is arranged such that a projection disposed on the outer peripheral surface of a lens unit as a lens frame of a photographing optical system is abutted against the cam surface of a drive lever and the drive lever is rotated by being pressed by the projection to thereby project the strobe light emitter from a camera main body through an urging member.

However, Japanese Unexamined Patent Publication No. 8-160516 discloses nothing as to the strobe light emitter built in a camera, a drive means for driving the strobe light emitter, and the like and any consideration is not given to them. Therefore, the technical means disclosed in the publication cannot solve the problems which arise to the design of a camera main body when, for example, the specification of the strobe light emitter is changed.

On the other hand, the means disclosed in Japanese Unexamined Patent Publication No. 8-286242 lacks general versatility because when the shape of the lens unit is to be changed or when the drive mechanism is to be changed, the design of the strobe unit itself must be modified and further it is very difficult to use the strobe unit to other type of a camera. Therefore, there is a problem that a partial change of the design of a camera requires to redesign the camera entirely and a manufacturing cost is increased thereby.

SUMMARY OF THE INVENTION

A first object of the present invention is to provide a camera having a strobe light emitter, which is movable to a light emission possible position where the strobe light emitter projects from a camera main body and an accommodating position where it is accommodated in the camera main body, and a drive means for driving the strobe light emitter, wherein the design, specification and the like of the camera can be changed merely by partially changing the design of the camera in a minimum necessary portion.

A second object of the present invention is to provide a camera composed of a camera main body which contributes to the improvement of productivity by suppressing an increase of a manufacturing cost when the design, specification and the like of the camera are changed as well as reliably secures strength for ensuring that the camera is not easily subjected to deformation and the like when external stress and load are imposed thereon.

To briefly describe, the present invention is characterized in that a camera having a camera main body is composed of a plurality of units including at least a lens barrel unit, a spool chamber unit and a Patrone chamber unit, wherein the camera is provided with a strobe light emitter movable to a light emission possible position where it projects from the camera main body and an accommodating position where it is accommodated in the camera main body and the strobe light emitter is driven by a drive mechanism supported by a spool chamber unit or a Patrone chamber unit.

These and other objects of the present invention and the advantages thereof will become apparent from the following detailed description.

According to the present invention, there can be provided the camera having the strobe light emitter, which is movable to the light emission possible position where the strobe light emitter projects from the camera main body and the accommodating position where it is accommodated in the camera main body, and the drive means for driving the strobe light emitter, wherein the design, specification and the like of the camera can be changed merely by only partially changing the design of the camera in a minimum necessary portion.

Further, there can be provided the camera composed of the camera main body which contributes to the improvement of productivity by suppressing an increase of a manufacturing cost when the design, specification and the like of the camera are changed as well as reliably secures strength for ensuring that the camera is not easily subjected to deformation and the like when external stress and load are imposed thereon.

DETAILED DESCRIPTION OF THE PREFERRED EMBODIMENT

Figure 1:
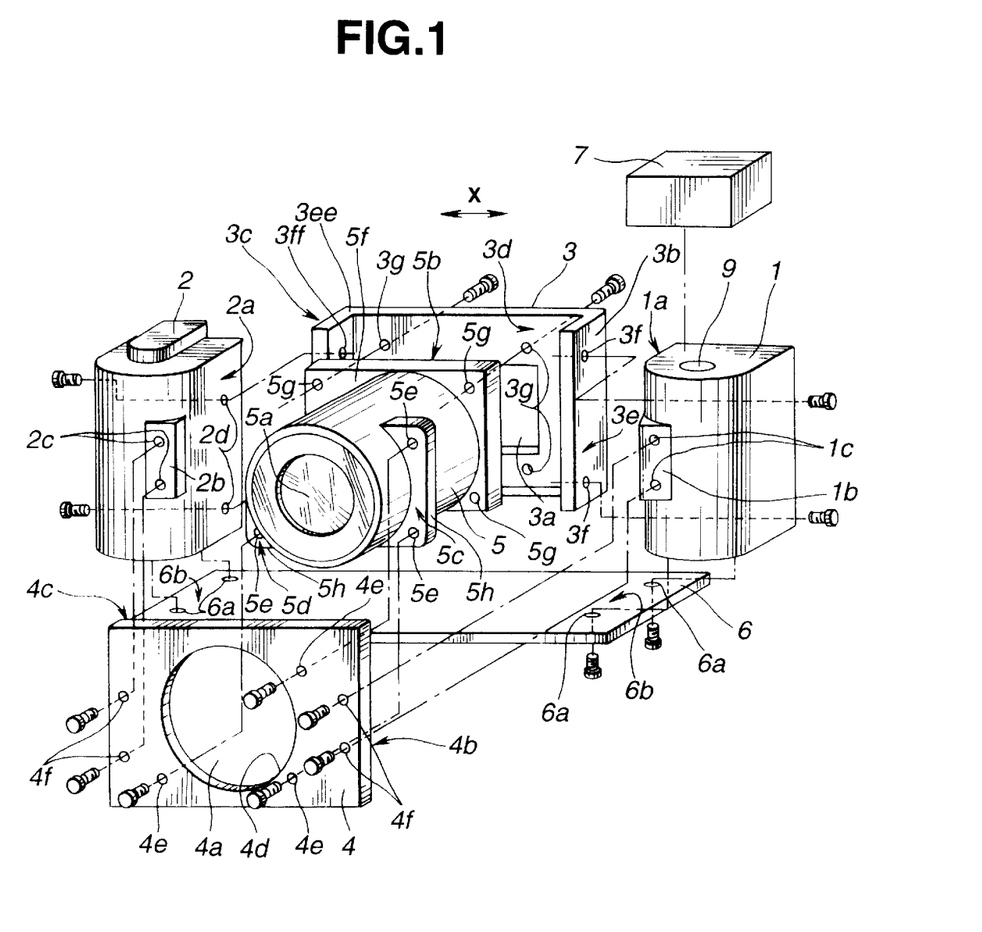
FIG. 1 is an exploded perspective view showing an arrangement of a camera main body of a camera of an embodiment of present invention.

FIG. 1 is an exploded perspective view showing an arrangement of a camera main body of a camera of an embodiment of present invention.

First, a major arrangement of the camera main body will be described with reference to FIG. 1.

In the camera of the embodiment, the camera main body is composed of a spool chamber unit 1 for forming a spool chamber in which a spool shaft 9 for winding an exposed roll film is rotatably disposed, a Patrone chamber unit 2 for forming a Patrone chamber in which a film Patrone (not shown) having an unexposed roll film wound and accommodated therein is loaded, a substantially-flat-plate-shaped rail member 3 including an aperture opening 3a and guide rails (not shown) and coupling the spool chamber unit 1, the Patrone chamber unit 2 and a lens barrel unit 5, the lens barrel unit 5 having a photographing lens 5a and the like therein, a substantially-flat-plate-shaped coupling reinforcing member 4 for reinforcing the coupling of the respective units from the front surface of the camera main body, a slender and substantially-flat-plate-shaped lower coupling member 6 for reinforcing the coupling of the respective units from the bottom of the camera main body, and the like.

The rail member 3 includes at least the aperture opening 3a located substantially at the center thereof and the guide rails disposed to the back thereof as described above. The aperture opening 3a forms an image frame by permitting the light from the lens barrel unit 5 to pass therethrough. Further, the guide rails serve the role of securing the flatness of the roll film by pressing both side edges of the film in the width direction thereof in cooperation with a presser plate (not shown) disposed on the rear lid (not shown) of the camera as well as regulating the position of the film with respect to the aperture opening 3a.

The coupling reinforcing member 4 includes an opening 4a which is located substantially at the center thereof. The opening 4a has a shape and size which are substantially similar to the outside diameter of the lens barrel unit 5. Three through holes 4e are defined at prescribed positions around the peripheral edge of the opening 4a for mounting the lens barrel unit. Further, two pair of through holes 4f are provided at both end edges of the coupling reinforcing member 4 for mounting it to the spool chamber unit 1 and the Patrone chamber unit 2.

The lens barrel unit 5 is formed to a cylindrical shape and includes the photographing lens 5a and the like therein as described above. Rib portions 5h are disposed to the lens barrel unit 5 integrally therewith at midpoints on the right and left sides of the outer peripheral surface thereof and screw holes 5e are provided at prescribed positions of the rib portions 5h in correspondence with the through holes 4e.

A substantially-flat-plate-shaped lens barrel mounting plate 5f is attached to the rear end of the lens barrel unit 5 integrally therewith. The lens barrel mounting plate 5f has an opening (not shown) located substantially at the center thereof. The opening has a shape and size which are substantially similar to the outside diameter of the lens barrel unit 5. In addition, four screw holes 5g for attaching the rail member 3 are defined at the four corners of the lens barrel mounting plate 5f (only three screw holes are shown in FIG. 1).

The rib portions 5h and the lens barrel mounting plate 5f of the lens barrel unit 5 are disposed normal to the optical axis of the photographing lens 5a.

In addition, the rib portions 5h and the lens barrel mounting plate 5f of the lens barrel unit 5 may be molded integrally with the lens barrel unit 5. Otherwise, they may be formed separately from the lens barrel unit 5 and adhered to prescribed positions of the lens barrel unit 5 by an adhesive means such an adhesive or the like.

The rail member 3 has bent portions 3e, 3ee which are formed by bending both the edges thereof in a long side direction forward at right angles, respectively. Two through holes 3f are provided in one of the bent portions or the bent portion 3e to mount the spool chamber unit 1 thereto and two through holes 3ff are provided in the other bent portion 3ee (only one of them is shown in FIG. 1) to mount the Patrone chamber unit 2 thereto, respectively.

The aperture opening 3a is formed to the rail member 3 substantially at the center thereof so as to form the image frame as described above. Four through holes 3g (only three of them are shown in FIG. 1) are provided in the peripheral edge portion of the aperture opening 3a at the positions. thereof which confront the screw holes 5g of the lens barrel mounting plate 5f of the lens barrel mounting plate 5f when the lens barrel mounting plate 5f is coupled with the rail member 3.

On the other hand, a coupling portion 1b, which has two screw holes 1c defined thereto in confrontation with the through holes 4f, is disposed on the front surface of the spool chamber unit 1 to couple the spool chamber unit 1 with the coupling reinforcing member 4. Note, the shape of the spool chamber unit 1 simplified in FIG. 1 (refer to FIG. 4 to be described later as to the detail of the spool chamber unit 1).

Two screw holes (not shown) are provided in the inside of the spool chamber unit 1, that is, to the side thereof near to the lens barrel unit to couple the spool chamber unit 1 with the rail member 3. Further, two screw holes (not shown) are defined to the bottom of the spool chamber unit 1 to hold it on the lower coupling member 6.

A coupling unit 2b, which has two screw holes 2c defined thereto in confrontation with the through holes 4f, is disposed on the front surface of the Patrone chamber unit 2 at a position near to the lens barrel unit to couple the Patrone chamber unit 2 with the coupling reinforcing member 4 like the spool chamber unit 1. Two screw holes 2d are provided in the inside of the Patrone chamber unit 2, that is, to the side thereof near to the lens barrel unit to couple the Patrone chamber unit 2 with the rail member 3. Further, two screw holes (not shown) are provided in the bottom of the Patrone chamber unit 2 to hold it on the lower coupling member 6.

Four through holes 6a are provided in the right and left side edges of the lower coupling member 6 at the positions thereof which correspond to the above screw holes (not shown) provided in the bottoms of the spool chamber unit 1 and the Patrone chamber unit 2, respectively.

The camera main body of the embodiment is assembled by coupling the above respective units as described above.

That is, the opening 4a of the coupling reinforcing member 4 is fitted over the lens barrel unit 5 from the front side of the lens barrel unit 5; the three through holes 4e of the coupling reinforcing member 4 are aligned with the three screw holes 5e of the rib portions 5h in a state that the abutting surface 4d of the coupling reinforcing member 4 on the backside thereof is abutted against the abutting surfaces 5c, 5d of the rib portions 5h of the lens barrel unit 5 on the front surface thereof; and the coupling reinforcing member 4 is secured to the lens barrel unit 5 through screws from the front side.

Since the front surfaces of the rib portions 5h are normal to the optical axis of the photographing lens 5a as described above, the coupling reinforcing member 4 abutted against the abutting surfaces 5c, 5d of the rib portions 5h are also made normal to the optical axis of the photographing lens 5a.

Further, the four screw holes 5g of the lens barrel mounting plate 5f are aligned with the four through holes 3g of the rail member 3 in a state that the abutting surface 5b on the back surface of the lens barrel mounting plate 5f is abutted against the abutting surface 3d of the peripheral edge portion of the aperture opening 3a of the rail member 3; and the lens barrel unit 5 is secured to the rail member 3 from the back surface.

The lens barrel mounting plate 5f is also formed normal to the optical axis of the photographing lens 5a like the rib portions 5h. Therefore, the rail member 3 abutted against the abutting surface 5b of the lens barrel mounting plate 5f is also coupled in a state that it is normal to the optical axis of the photographing lens 5a.

The spool chamber unit 1 is coupled with one of the bent portions or the bent portion 3e of the rail member 3. That is, the two through holes 3f of the bent portion 3e are aligned with the two screw holes (not shown) of the spool chamber unit 1 in a state that the abutting surface 3b of the bent portion 3e is abutted against the abutting surface 1a of the inside of the spool chamber unit 1; and the spool chamber unit 1 is tightened to the rail member 3 through screws from the inside of the rail member 3.

The bent portion 3e is bent forward at right angles with respect to the rail member 3 as described above. That is, the abutting surface 3b of the bent portion 3e is formed such that it is parallel with the optical axis of the photographing lens 5a as well as at right angles with respect to a film feed direction (in the direction of an arrow X in FIG. 1). Therefore, the spool chamber unit 1 abutted against the abutting surface 3b of the bent portion 3e is coupled such that the abutting surface 1a thereof is parallel with the optical axis of the photographing lens 5a as well as at right angles with respect to the film feed direction X.

At the same time, the abutting surface of the coupling portion 1b of the spool chamber unit 1 is abutted against the abutting surface 4b of the coupling reinforcing member 4 and the two screw holes 1c of the coupling portion 1b are aligned with the two through holes 4f of the coupling reinforcing member 4. In this state, the coupling reinforcing member 4 is secured to the spool chamber unit 1 through screws from the front surface.

Since the coupling reinforcing member 4 is disposed normal to the optical axis of the photographing lens 5a as described above and the abutting surface of the coupling portion 1b of the spool chamber unit 1 is also normal to the optical axis of the photographing lens 5a likewise, the spool chamber unit 1 is disposed normal to the optical axis of the photographing lens 5a.

The Patrone chamber unit 2 is coupled with the other bent portion 3ee of the rail member 3. That is, the two through holes 3ff of the bent portion 3ee are aligned with the two screw holes 2d of the Patrone chamber unit 2 in a state that the abutting surface 3c of the bent portion 3ee is abutted against the abutting surface 2a of the Patrone chamber unit 2 on the inside thereof and the Patrone chamber unit 2 is secured to the rail member 3 by screws from the inside of the rail member 3.

As described above, the bent portion 3ee is bent forward at right angles with respect to the rail member 3 like the bent portion 3e. That is, the abutting surface 3c of the bent portion 3ee and the abutting surface 2a of the Patrone chamber unit 2 which is abutted against the abutting surface 3c are formed parallel with the optical axis of the photographing lens 5a as well as at right angles with respect to the film feed direction X. Therefore, the Patrone chamber unit 2 is disposed parallel with the optical axis of the photographing lens 5a as well as at right angles with respect to the film feed direction X.

At the same time, the abutting surface 2a of the coupling portion of the Patrone chamber unit 2 is butted against the abutting surface 4c of the coupling reinforcing member 4 on the back surface thereof and the two screw holes 2c of the coupling portion are aligned with the two through holes 4f of the coupling reinforcing member 4. Therefore, the coupling reinforcing member 4 is secured to the Patrone chamber unit 2 by screws from the front surface.

Since the coupling reinforcing member 4 is disposed normal to the optical axis of the photographing lens 5a as described above and further the abutting surface 2a of the Patrone chamber unit 2 is also normal to the optical axis of the photographing lens 5a, the Patrone chamber unit 2 is disposed normal to the optical axis of the photographing lens 5a.

With this arrangement, the lens barrel unit 5, the rail member 3, the spool chamber unit 1, the Patrone chamber unit 2 and the coupling reinforcing member 4 which are coupled and integrated with each other are held on the lower coupling member 6. In this case, the two screw holes of the bottom of the spool chamber unit 1 and the two screw holes of the bottom of the Patrone chamber unit 2 are aligned with the four through holes 6a of the lower coupling member 6, respectively and the spool chamber unit 1 and the Patrone chamber unit 2 are secured to the lower coupling member 6 by screws from the bottom side in a state that the bottom of the spool chamber unit 1 and the bottom of the Patrone chamber unit 2 are abutted against the abutting surface 6b of the lower coupling member 6 on the upper surface thereof.

Further, a strobe unit 7 (which will be described later in detail) composed of a strobe light emitter and the like which are movable to a light emission possible position where the strobe light emitter projects from the camera main body and an accommodating position where it is accommodated in the camera main body is supported on any one of the spool chamber unit 1 and the Patrone chamber unit 2 through a drive means (which is not shown in FIG. 1 and will be described later in detail) for driving the strobe unit 7. Note, FIG. 1 shows a case that the strobe unit 7 is disposed on the spool chamber unit 1 side.

Next, a drive force switching/transmitting mechanism of the camera of the embodiment will be described with reference to FIG. 2 and FIG. 3.

Figure 2:
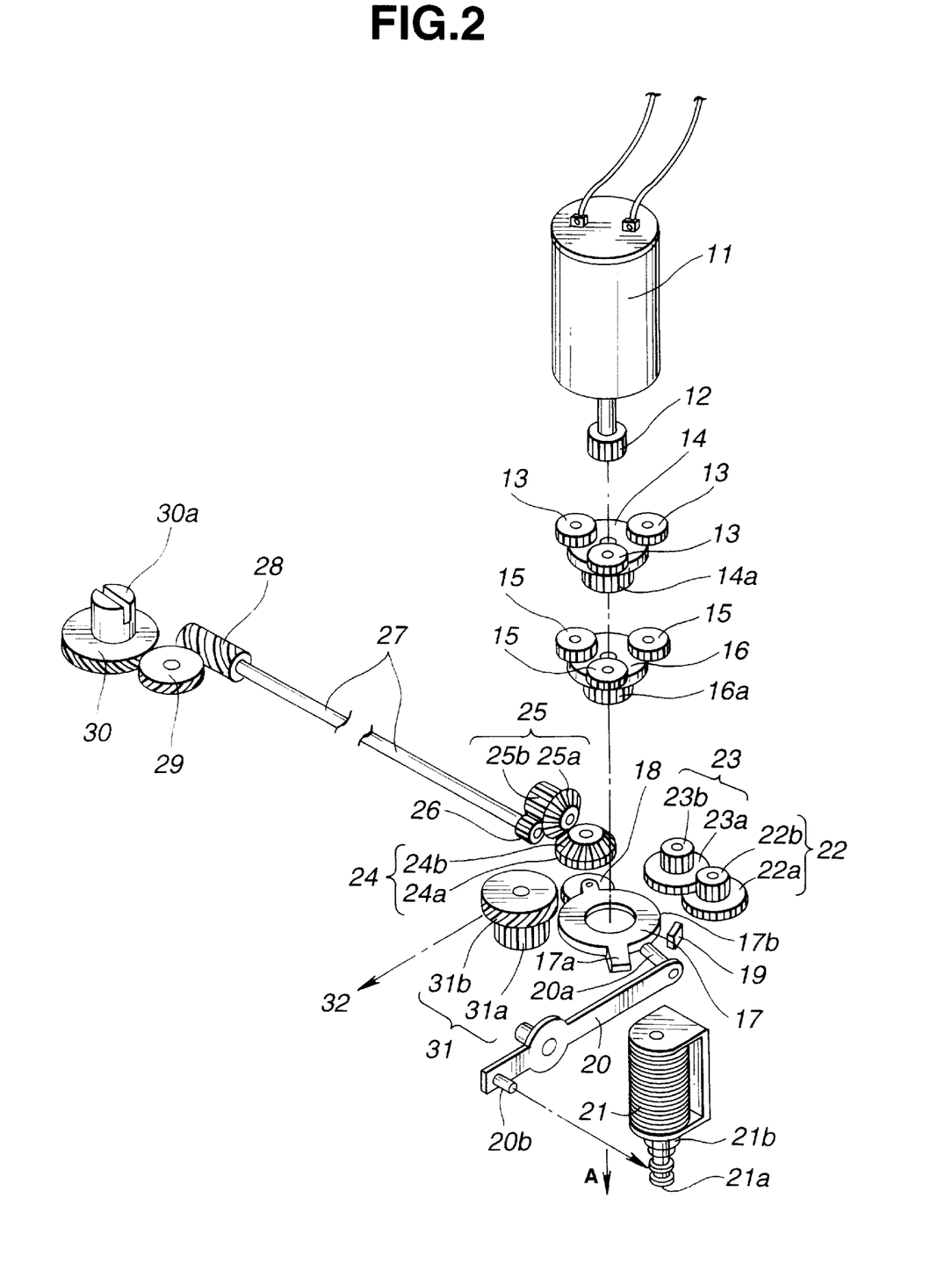
FIG. 2 is an exploded perspective view showing a main portion of a drive force switching mechanism of a drive force switching/transmitting mechanism of the camera of FIG. 1, the drive force switching mechanism switching a direction in which the drive force of a drive motor is transmitted.
Figure 3:
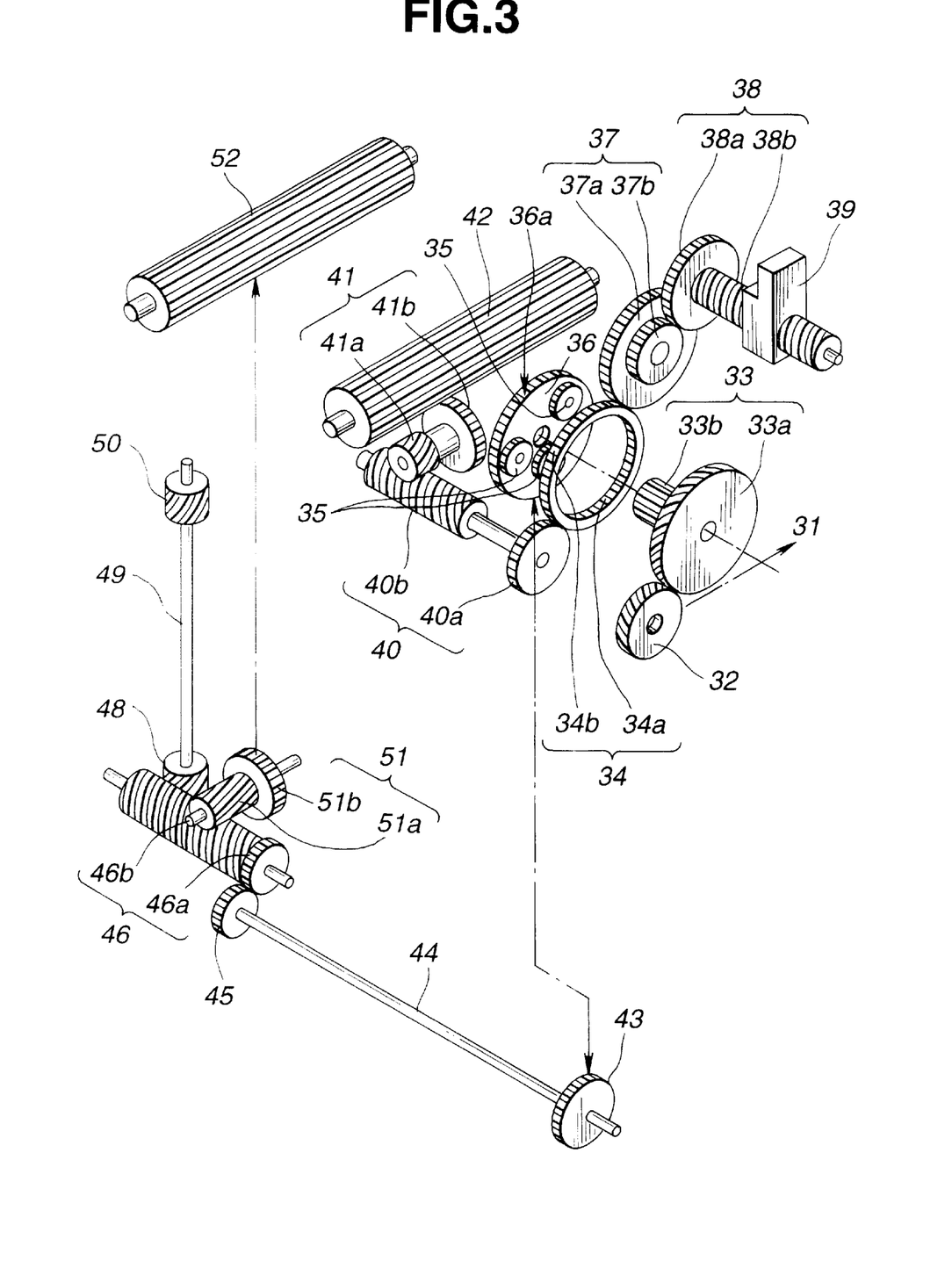
FIG. 3 is an exploded perspective view showing a drive force transmitting mechanism of the drive force switching/transmitting mechanism of the camera of FIG. 1, the drive force transmitting mechanism transmitting the drive force to respective drive units.

FIG. 2 and FIG. 3 show exploded perspective views of the drive force switching/transmitting mechanism of the camera, wherein FIG. 2 is an exploded perspective view showing a main portion of a drive force switching mechanism for switching a direction in which the drive force of a drive motor as a drive source of the camera is transmitted and FIG. 3 is an exploded perspective view of a drive force transmitting mechanism for transmitting the drive force switched by the drive force switching mechanism shown in FIG. 2 to respective units to be driven.

The drive force switching/transmitting mechanism of the camera is composed of the drive force switching mechanism (FIG. 2), the drive force transmitting mechanism (FIG. 3) and the like. The drive force switching mechanism is composed of the drive motor 11 serving as the drive source, a gear train composed of a planetary gear mechanism and the like, a drive shaft, and the like and switches a direction in which the drive force of the drive motor 11 is transmitted to various types of the units in the camera to be driven.

As shown in FIG. 2, the drive motor 11 is rotatably supported in the spool chamber unit 1, disposed in the spool shaft 9 (refer to FIG. 1) around which the exposed roll film is wound and supported on a base plate (not shown) fixed to the spool chamber unit 1. A pinion gear 12 is secured to the output shaft of the drive motor 11 and meshed with three planetary gears 13 rotatably mounted on a carrier 14. A sun gear 14a is secured to the carrier 14 and meshed with three planetary gears 15 rotatably mounted on a carrier 16.

A sun gear 16a is secured to the carrier 16 and the planetary gears 13, 15 are meshed with an internal gear (not shown) disposed to the base plate. With this arrangement, the planetary gear mechanism using the sun gear 16a as an output unit is arranged.

The sun gear 16a of the carrier 16 is always meshed with a planetary gear 18 which is rotatably supported at the outer periphery of a rotatably supported carrier arm 17. The planetary gear 18 is rotatably supported so as to rotate around the sun gear 16a in a state that a load due to a frictional force is imposed on the carrier arm 17.

On the other hand, a locking lever 20 is swingably supported in the spool chamber unit 1 and includes pins 20a, 20b implanted in the respective extreme ends of both arms thereof. The movable iron core 21a of a plunger 21 as an electromagnet is engaged with the pin 20b. With this arrangement, when the plunger 21 is energized or deenergized, the movable iron core 21a is attracted to or released from the pin 20b so that the locking lever 20 is swung following the above operation. The movable iron core 21a is urged in the direction of an arrow A in FIG. 2 by a spring 21b. The pin 20a is locked to a locking portion 17a disposed to the outer periphery of the carrier arm 17.

When the plunger 21 is energized, the movable iron core 21a of the plunger 21 is attracted against the urging force of the spring 21b and the pin 20b of the locking lever 20 follows the movable iron core 21a. With this operation, the pin 20a of the locking lever 20 is unlocked from the locking portion 17a of the carrier arm 17, whereby the carrier arm 17 can be rotated in either of two opposite directions. The rotation of the carrier arm 17 permits the planetary gear 18 to be meshed with any one of a two-stage gear 31, a two-stage gear 22 and a two-stage gear 24. That is, the planetary gear 18 is meshed with any one of the two-stage gear 31, two-stage gear 22 and two-stage gear 24 depending upon a position to which the carrier arm 17 is rotated.

More specifically, when the carrier arm 17 is rotated counterclockwise and located at a regulating position, the planetary gear 18 is meshed with the spur gear 31a of the two-stage gear 31; when the carrier arm 17 is rotated clockwise and located at a regulating position, the planetary gear 18 is meshed with the spur gear 24a of the two-stage gear 24; and when the carrier arm 17 is rotated counterclockwise without being regulated, the planetary gear 18 is meshed with the large diameter gear 22a of the two-stage gear 22.

The two-step gear 31 is composed of the spur gear 31a and a helical gear 31b, the two-stage gear 22 is composed of the large diameter gear 22a and a small diameter gear 22b and the two-stage gear 24 is composed of the spur gear 24a and a bevel gear 24b, respectively.

The rotating position of the carrier arm 17 can be detected by detecting a reflection plate 17b mounted on the outer peripheral surface of the carrier arm 17 by a photo-reflector (hereinafter, referred to as a PR) 19 disposed to a fixed portion (not shown) of the camera main body.

The small diameter gear 22b of the two-stage gear 22 is meshed with the large diameter gear 23a of a two-stage gear 23 and the small diameter gear 23b of the two-stage gear 23 is meshed with a gear (not shown) disposed to the spool shaft 9 of the spool chamber unit 1 to thereby arrange a drive force transmission mechanism for winding the exposed roll film.

The spur gear 24a of the two-stage gear 24 is meshed with the bevel gear 25a of a two-stage gear 25 and the spur gear 25b of the two-stage gear 25 is meshed with a spur gear 26. The spur gear 26 is secured to an end of a drive shaft 27 and a worm gear 28 is secured to the other end of the driving shaft 27. The worm gear 28 is meshed with a worm wheel 29 which is meshed with a rewinding (RW) gear 30 disposed in the Patrone chamber unit 2. A rewind (RW) fork 30a coupled with the RW gear 30. An urging member such as an extensible spring or the like is disposed in the RW fork 30a and always urges the RW fork 30a in a projecting direction so that the RW fork 30a is engaged with the spool shaft of a film Patrone (not shown) loaded in the Patrone chamber unit 2. With this arrangement, there is formed a drive force transmission mechanism for rewinding the exposed roll film into the film Patrone (not shown) from the spool chamber unit 1 side.

The drive shaft 27 having the spur gear 26 and the worm gear 28 secured to opposite ends thereof is mounted on the lower coupling member 6 and the worm wheel 29 and the rewinding gear 30 are disposed in the Patrone chamber unit 2.

The helical gear 31b of the two-step gear 31 is meshed with an idle gear 32 shown in FIG. 3. As shown in FIG. 3, the idle gear 32 is meshed with the helical gear 33a of a two-stage gear 33 and the sun gear 33b of the two-stage gear 33 is meshed with the three planetary gears 35 which are rotatably supported by a carrier 36 having a spur gear portion 36a around the outer peripheral portion thereof. Further, the planetary gears 35 are meshed with the internal gear 34a of an internal/external gear 34 composed of the internal gear 34a and an external gear 34b. The sun gear 33b, the three planetary gears 35, the carrier 36 and the internal/external gear 34 constitute a planetary speed reducing mechanism.

On the other hand, the external gear 34b of the internal/external gear 34 is meshed with the large diameter gear 37a of a two-stage gear 37, the small diameter gear 37b thereof is meshed with the spur gear portion 38a of a feed screw 38 composed of the spur gear portion 38a and a feed screw portion 38b. Further, a nut member 39 is screwed to the feed screw portion 38b of the feed screw 38 and the strobe light emitter of the strobe unit 7 is driven through the nut member 39 (the detail of which will be described later). Note, the respective members from the two-step gear 31 to the nut member 39 are attached to the spool chamber unit 1.

On the other hand, the external gear 34b of the internal/external gear 34 is meshed with the spur gear portion 40a of a two-stage gear 40 composed of the spur gear portion 40a and a worm portion 40b. Further, the worm portion 40b of the two-stage gear 40 is meshed with the worm wheel portion 41a of a two-stage gear 41. The spur gear portion 41b of the two-stage gear 41 is mounted on the lens barrel unit 5 and meshed with a long shaft gear 42 which drives the photographing lens 5a in the lens barrel unit 5. Note, the two-stage gear 40 and the two-stage gear 41 are attached to the lower coupling member 6.

The spur gear portion 36a of the carrier 36 is meshed with a spur gear 43 secured to an end of a drive shaft 44. A spur gear 45 is secured to the other end of the drive shaft 44 and meshed with the spur gear portion 46a of a two-stage gear 46 composed of the spur gear portion 46a and a worm portion 46b. The worm portion 46b is meshed with the worm wheel portion 51a of a two-stage gear 51. Further, a long shaft gear 52 is meshed with the spur gear 51b of the two-stage gear 51 and drives the photographing lens 5a in the lens barrel unit 5 so that it changes a photographing magnification.

In addition, a worm wheel 48 secured to an end of a drive shaft 49 is meshed with the worm portion 46b at a position different from the position where the worm wheel portion 51a is meshed with the worm portion 46b. A helical gear 50 is secured to the other end of the drive shaft 49 so that the finder optical system of a finder unit (not shown) for observing a subject image changes a photographing magnification through the helical gear 50.

The spur gear 43, the two-stage gear 46 and the two-stage gear 51 are mounted on the lower coupling member 6. The long shaft gear 52 is mounted on the lens barrel unit 5 likewise the long shaft gear 42.

Next, the strobe unit 7 and the drive means for driving it in the camera of the embodiment will be described with reference to FIG. 4, FIG. 5 and FIG. 6.

Figure 4:
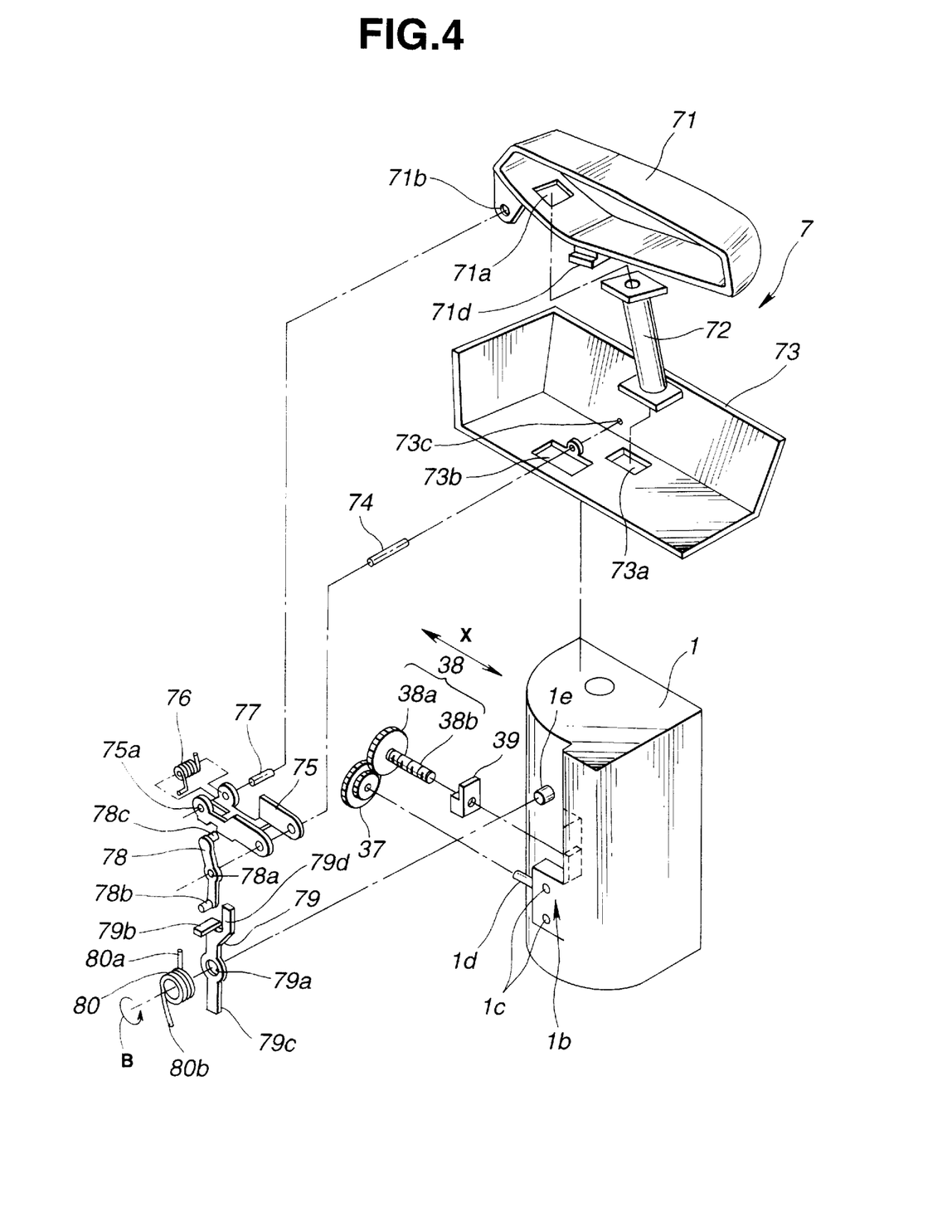
FIG. 4 is an exploded perspective view showing a main portion of an arrangement of a strobe unit and a drive means thereof in the camera of FIG. 1.
Figure 5:
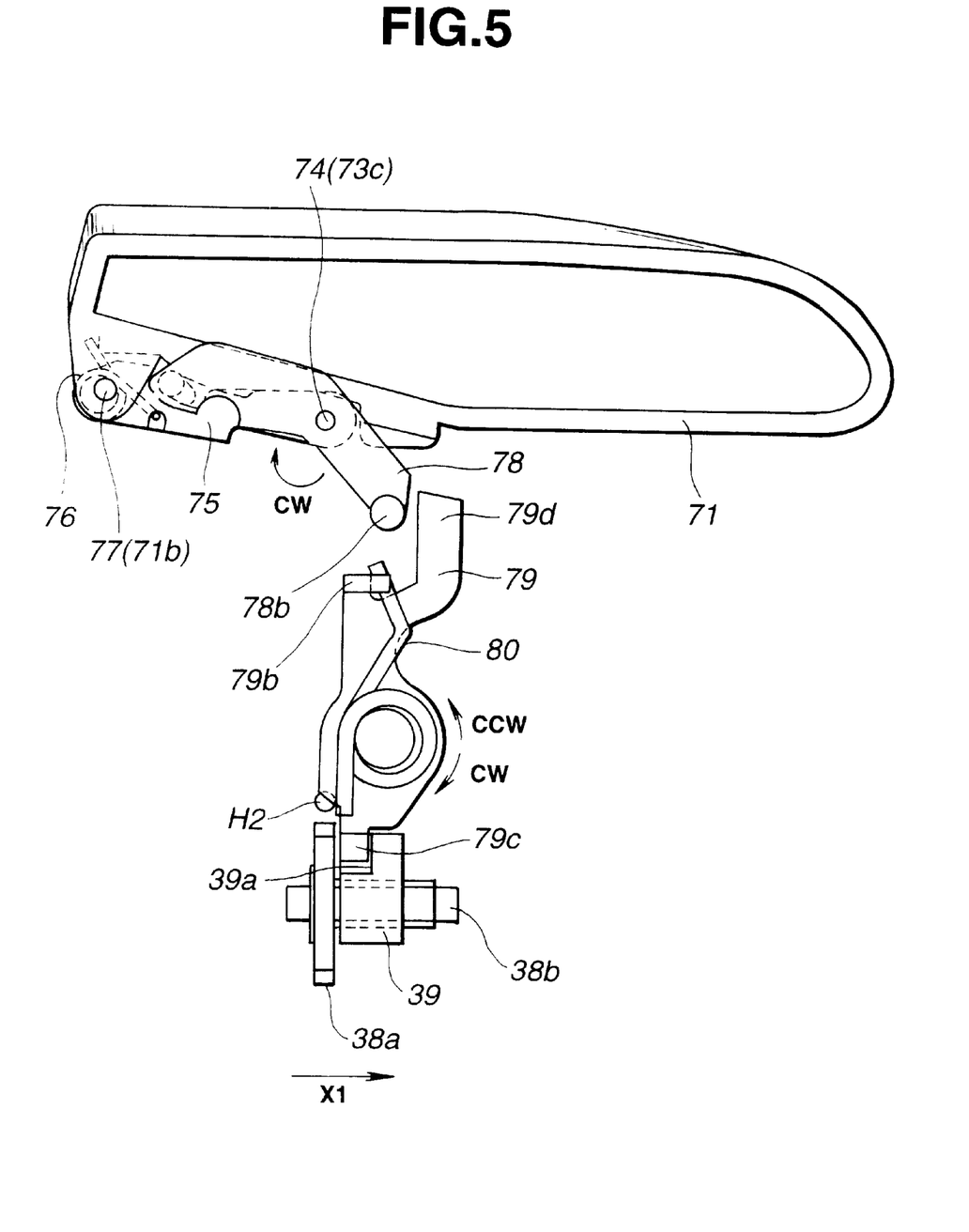
FIG. 5 is a front elevational view showing a state that the strobe unit is located at an accommodating position where it is accommodated in a camera main body to describe an operation of the strobe unit and the drive means thereof in the camera in FIG. 1.
Figure 6:
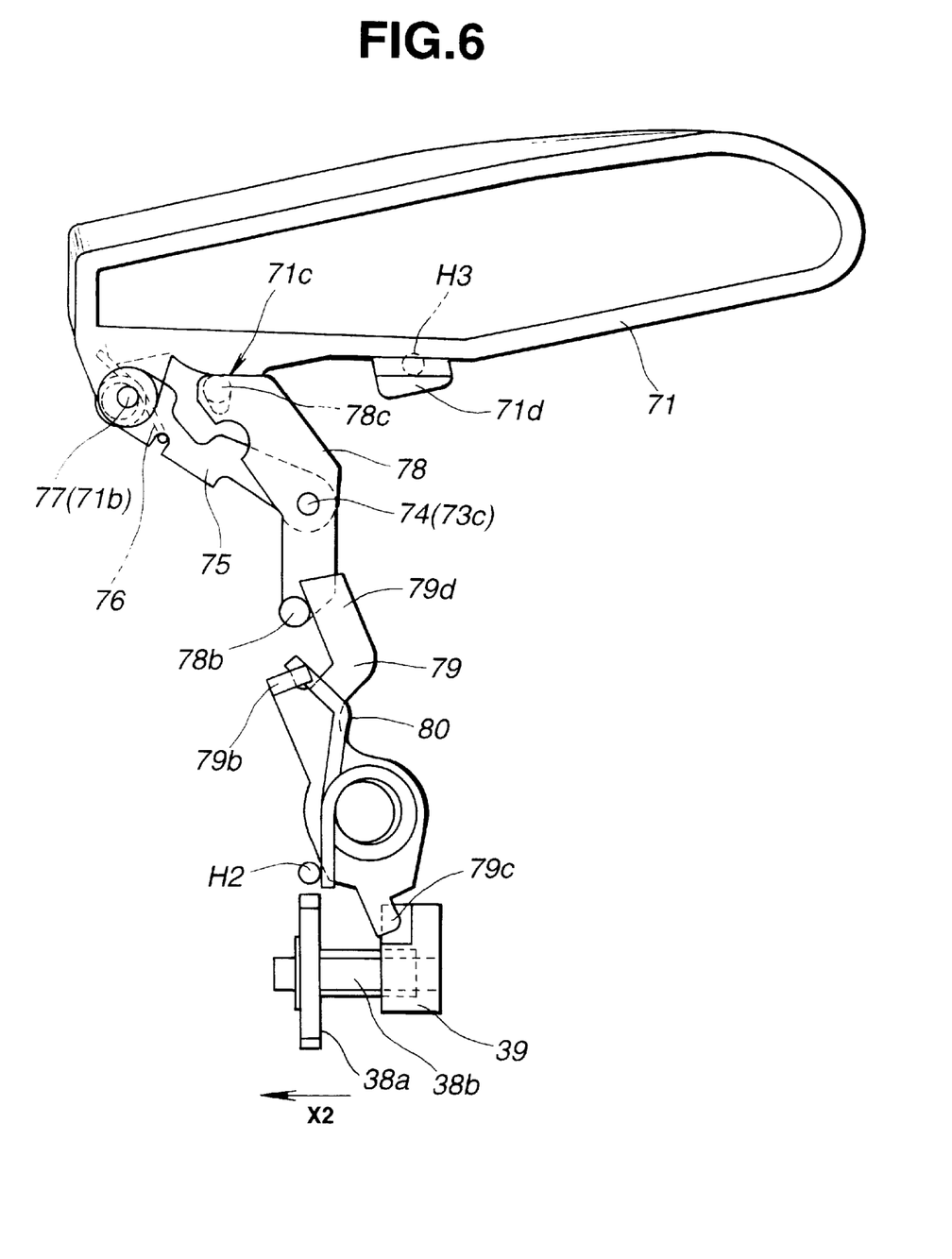
FIG. 6 is a front elevational view showing a state that the strobe unit is located at a light emission possible position where it projects form the camera main body to describe an operation of the strobe unit and the drive means thereof in the camera in FIG. 1.

FIG. 4 is an exploded perspective view showing a main portion of the arrangement of the strobe unit and the drive means thereof in the above camera and FIG. 5 and FIG. 6 are front elevational views showing main portions of the strobe unit the drive unit thereof provided to describe the operation thereof. FIG. 5 shows a state that the strobe unit 7 is located at the accommodating position where it is accommodated in the camera main body and FIG. 6 shows a state that the strobe unit 7 is located at the light emission possible position where it projects from the camera main body, respectively.

First, how the strobe unit 7 and the drive means thereof are arranged will be described using FIG. 4. The strobe unit 7 is composed of a strobe cabinet 71, a strobe partition member 73 in which the strobe cabinet 71 is accommodated, a drive mechanism as a drive means for driving a strobe light emitter, and the like. The strobe cabinet 71 accommodates the strobe light emitter composed of, for example, a xenon (Xe) discharge tube, a reflection shade, a light emitting window and the like.

Although the strobe light emitter is not illustrated in detail, a conventionally used ordinary strobe light emitter is employed as the above strobe light emitter. Thus, the strobe light emitter is neither described in detail nor illustrated here.

A hole 71a is provided at the bottom of the strobe cabinet 71. An end of a flexible tube-shaped rubber tube 72 is water tightly adhered to the strobe cabinet 71 so as to cover the hole 71a. The other end of the rubber tube 72 is water-tightly adhered to the strobe partition member 73 so as to cover the hole 73a provided therein. Lead wires (not shown) connected to the respective members in the strobe cabinet 71 are guided from the hole 71a to the outside of the strobe cabinet 71, pass through the rubber tube 72 and further guided from the hole 73a of the strobe partition member 73 into the camera main body. With this arrangement, the lead wires electrically connect the respective members in the strobe cabinet 71 to a strobe circuit board and the like (not shown) located at the camera main body.

A shaft receiving hole portion 71b is disposed downward to an end of the strobe cabinet 71 and an end of a support member 75 is supported by the shaft receiving hole portion 71b through a shaft 77, which permits the rotation of the strobe cabinet 71. An urging spring 76 employed as an urging means is wound around the shaft 77 and urges the strobe cabinet 71 in a direction where it is accommodated in the camera main body.

On the other hand, the other end of the support member 75 is rotatably supported by a hole 73c provided in the inside wall surface of the strobe partition member 73 through a shaft 74. Further, a lift lever 78 is supported by the shaft 74 so as to rotate approximately about the center of the hole 78a thereof. The lift lever 78 is disposed downward from the hole 73b provided in the bottom of the strobe partition member 73 and the hole 73b is covered are made water tight with a rubber member (not shown) or the like, like the hole 73a. A shaft 78c is implanted in the upper end of the lift lever 78 toward the back surface of the camera and a shaft 78b is implanted in the lower end thereof toward the front surface of the camera.

On the other hand, a shaft portion 1d is implanted in the side of the coupling portion 1b disposed on the front surface of the spool chamber unit 1 and the two-stage gear 37 for transmitting the drive force of the drive motor 11 is rotatably supported by the shaft portion 1d. An end of the feed screw portion 38b of the feed screw 38 which is meshed with the two-stage gear 37 is rotatably supported at a position above the coupling portion 1b and the nut member 39 is screwed to the feed screw portion 38b as described above. That is, the drive force of the drive motor 11 is transmitted through a drive force transmission mechanism and the rotation of the feed screw portion 38b permits the nut member 39 to selectively slide in one of two directions of double-headed arrow X in FIG. 4. Therefore, the feed screw portion 38b of the feed screw 38 acts as a transmission means for directly transmitting the drive force of the drive motor 11 to the nut member 39 in order to move the nut member 39 to a locking position (shown in FIG. 5) and an unlocking position (shown in FIG. 6).

A shaft portion 1e is further implanted to extend forward from the front surface on the front surface of the spool chamber unit 1. A lever member 79, which is a coupling means for coupling the spool chamber unit 1 with the strobe unit 7 as well as a drive means for driving the strobe unit 7, is supported by the shaft portion 1e so as to rotate about the hole 79a provided in the lever member 79 approximately at a center. Further, an urging spring 80 employed as an urging member is attached to the shaft portion 1e. One end 80a of the urging spring 80 is locked by the locking claw 79b of the lever member 79 and the other end 80b thereof is locked by a fixed projection H2 (refer to FIG. 5 and FIG. 6) disposed on the camera main body. With this arrangement, the urging spring 80 constantly urges the lever member 79 in the direction of an arrow B of FIG. 4 (counterclockwise; CCW). That is, when the urging spring 80 is unlocked from the locking claw 79b of the lever member 79, it urges the strobe cabinet 71 in a direction where the strobe cabinet 71 projects from the camera main body.

An operation for projecting and retracting the strobe unit 7 from and to the camera main body in the camera of the embodiment arranged as described above will be described. It is assumed in the camera that when the main circuit board (not shown) of the camera is turned on by the actuation of the main power supply switch (not shown) or the like of the camera, the strobe unit 7 is projected from the camera main body and moved to the light emission possible position where it can emit light (the state shown in FIG. 6), whereas when the main circuit board of the camera is turned off, the strobe unit 7 is moved to the accommodating position in the camera main body thereby (the state shown in FIG. 5).

That is, FIG. 5 shows a case that the main power supply of the camera is turned off and FIG. 6 shows a case that the main power supply of the camera is turned on and photographing is permitted, respectively.

First, when the main power supply of the camera is turned off, the nut member 39 is located at the position shown in FIG. 5 on the feed screw portion 38b and the lower end 79c of the lever member 79 is abutted against the locking portion 39a of the nut member 39 so that the counterclockwise (CCW) rotation of the lever member 79 executed by the urging force of the urging spring 80 is locked. That is, the nut member 39 acts as a locking means for locking the lever member 79. Further, the upper end 79d of the lever member 79 is completely separated from the shaft 78b at the lower end of the lift lever 78. Therefore, the strobe cabinet 71 is disposed at the accommodating position by the action of the urging spring 76 in this state.

When the main circuit board (not shown) of the camera is turned on by the actuation of the main power supply switch (not shown) of the camera or the like, the drive motor 11 is driven thereby and the drive force of the drive motor 11 rotates the feed screw portion 38b in a prescribed direction through the aforesaid drive force switching/transmitting mechanism, whereby the nut member 39 is moved in the direction of an arrow X1 in FIG. 5. Then, since the lever member 79 is released from the locked state, it is rotated counterclockwise in FIG. 5 by the urging force of the urging spring 80.

The rotation of the lever member 79 causes the upper end 79d thereof to be abutted against the shaft 78b at the lower end of the lift lever 78 and to press it. With this operation, the lift lever 78 is rotated clockwise (CW) in FIG. 5 about the shaft 74 as a center of rotation. Then, the shaft 78c at the upper end of the lift lever 78 is abutted against the outside wall portion 71c of the strobe cabinet 71 on the bottom thereof and lifts it against the urging force of the urging spring 76, whereby the strobe cabinet 71 is located at the light emission possible position where it projects from the camera main body (the state shown in FIG. 6).

Then, a locking portion 71d projecting from the bottom of the strobe cabinet 71 is abutted against a fixed projection H3 disposed to the camera main body and the rotation of the drive motor 11 is stopped so that the camera completes preparations for photographing. Since the nut member 39 is moved to the position shown in FIG. 6 in this state, the locking portion 39a of the nut member 39 is completely separated from the lower end 79c of the lever member 79.

When the main power supply of the camera is turned off in the state shown in FIG. 6, the drive motor 11 is driven thereby and rotates the feed screw portion 38b in a prescribed direction, whereby the nut member 39 is moved in the direction of an arrow X2 of FIG. 6 and the lower end 79c of the lever member 79 is pressed against the urging force of the urging spring 80. With this operation, the lever member 79 is rotated clockwise.

The rotation of the lever member 79 permits the lift lever 78 to be rotated by the urging force of the urging spring 76 counterclockwise about the shaft 74 as a center of rotation while maintaining the abutting state of the shaft 78b against the upper end 79d of the lever member 79 and the abutting state of the shaft 78c against the outside wall portion 71c of the carrier arm 71 on the bottom thereof. With this operation, the strobe cabinet 71 is moved to the state shown in FIG. 5 in which it is accommodated in the camera main body and the rotation of the drive motor 11 is stopped at the time.

Note, the urging force of the urging spring 80 for urging the strobe cabinet 71 to the light emission possible position is set to an amount larger than the urging force of the urging spring 76 for urging the strobe cabinet 71 to the accommodating position.

As described above, according to the above embodiment, the camera main body is composed of the plurality of units as well as the drive means for driving the strobe unit 7 and the coupling means (lever member 79) for coupling the drive means with the strobe unit 7 are disposed to the outside wall surface of the spool chamber unit 1. Accordingly, when the strobe unit 7 must be modified due to, for example, the change of specifications, and the like, the modification of the strobe unit 7 can be easily achieved only by modifying it without the need of modification of other units.

Further, since the strobe unit 7 is disposed in the vicinity of the spool chamber unit 1, the distance between the drive motor 11 disposed in the spool chamber unit 1 and the drive means for driving the strobe unit 7 can be shortened, whereby a loss of the drive force caused when the drive force is transmitted can be easily suppressed.

Although the embodiment is exemplified as to the camera whose main body is composed of the plurality of units such as the spool chamber unit 1, the Patrone chamber unit 2, the lens barrel unit 5 and the like, the embodiment is also applicable to a case that the strobe unit 7 is assembled to a camera main body which is arranged by integrating, for example, the spool chamber unit 1, the Patrone chamber unit 2 and the lens barrel unit 5.

Further, in the embodiment, the respective members such as the drive means for driving the strobe unit 7, the coupling means (lever member 79) for coupling the drive means with the strobe unit 7 and the like are disposed on the outside wall surface of the spool chamber unit 1. However, the present invention is not limited to the embodiment and the respective members such as, for example, the coupling means and the like may be disposed to the Patrone chamber unit 2. In this case, it suffices only to suitably modify the shape of the respective members such as the coupling means and the like as well as to also modify the shape of the strobe unit 7 in association with the above modification. With these modifications, an effect entirely the same as that of the above embodiment can be obtained.

It is apparent that embodiments which are different each other in a wide range can be arranged based on the invention without departing from the spirit and scope of the invention. The present invention is by no means restricted by any particular embodiment thereof except as may be limited by the appended claims.

What is claimed is:

1. A camera, comprising:
   a camera main body constituted by coupling a plurality of units including at least a lens barrel unit, a spool chamber unit and a Patrone chamber unit which are formed independently of one another, said units being coupled by fastening means enabling disassembly of said units for maintenance, repair and replacement thereof;
   a strobe light emitter movable to a light emission possible position where it projects from said camera main body and an accommodating position where it is accommodated in said camera main body; and
   a drive mechanism supported by one of the spool chamber unit and the Patrone chamber unit for moving said strobe light emitter.

2. A camera having a strobe unit movable to a light emission possible position where it projects from a camera main body and an accommodating position where it is accommodated in the camera main body, comprising:
   a coupling mechanism having an urging force applied thereto by urging means for moving the strobe unit to the light emission possible position and moving the strobe unit to the light emission possible position by the urging force;
   a locking mechanism for locking said coupling mechanism;
   a motor; and
   a transmission mechanism for moving said locking mechanism to a locking position and an unlocking position by directly transmitting a drive force of said motor to said locking mechanism, eliminating an intermediary mechanism between said motor and said locking mechanism.

3. A camera according to claim 2, wherein the camera main body has a lens barrel unit including a photographing lens, a spool chamber unit for forming a spool chamber and a Patrone chamber unit for forming a Patrone chamber and said coupling mechanism is supported by one of the spool chamber unit and the Patrone chamber unit.

4. A camera according to claim 2, wherein the camera main body has a lens barrel unit including a photographing lens and at least a spool chamber unit for forming a spool chamber and a Patrone chamber unit for forming a Patrone chamber and said coupling mechanism is supported by one of said spool chamber unit and said Patrone chamber unit.

5. A camera according to claim 2, wherein said locking mechanism is composed of a nut, a feed screw which is meshed with the nut being disposed to said transmission mechanism and the nut being moved by the rotation of the feed screw.

6. A camera according to claim 2, wherein the motor also acts as a motor for driving a lens barrel unit through lens barrel transmission means coupled between said motor and said lens barrel, said motor driving the strobe unit during the time of feeding and collapsing the lens barrel unit.

7. A strobe built-in camera having a strobe light emitter movable between a light emission possible position and an accommodating position, comprising:
   coupling means disposed in a vicinity of a spool chamber of a camera main body, and having an urging force applied by an urging means for moving the strobe light emitter to the light emission possible position and moving the strobe light emitter to the light commission possible position by the urging force;
   locking means for locking said coupling mechanism;
   a motor; and
   transmission means for moving said locking means to a locking position and an unlocking position by directly transmitting a drive force of said motor to said locking means, eliminating intermediary transmission mains.

8. A camera according to claim 7, wherein said camera main body is composed of a lens barrel unit including a photographing lens, a spool chamber unit for forming a spool chamber and a Patrone chamber unit for forming a Patrone chamber and said coupling means is supported by the spool chamber unit.

9. A camera according to claim 7, wherein said locking means is composed of a nut, a feed screw which is meshed with the nut being disposed to said transmission means and said locking means being moved by the rotation of the feed screw.

10. A camera according to claim 7, wherein said motor also acts as a motor for driving a lens barrel unit and driving the strobe light emitter in association with the operations for feeding and collapsing the lens barrel unit.

11. A camera including a pop-up strobe movable to a light emission possible position where it projects from a camera main body and an accommodating position where it is accommodated in the camera main body, comprising:
   a strobe main body;
   coupling means supported by a spool chamber, applied with a constant urging force in a direction for projecting said strobe main body from the camera main body by urging means and moving a strobe light emitter to the light emission possible position by the urging force;
   locking means for locking said coupling means against the urging force of said urging means;
   a motor; and
   transmission means for moving said locking means to a locking position and an unlocking position by directly transmitting a drive force of said motor to said locking means eliminating the need for intermediary transmission means.

12. A camera according to claim 11, further comprising second urging means for urging said strobe main body in a direction where it is accommodated in the camera main body from a state that said strobe main body projects from the camera main body, in addition to said first-mentioned urging means, wherein said strobe main body is accommodated in the camera main body by an urging force of said second urging means in association with the moving operation of said locking means to the unlocking position.

13. A camera having a camera main body composed of a plurality of units, comprising:

a lens barrel unit including a photographing lens;

a film unit for accommodating a film piece;

a securing mechanism for integrally joining said lens barrel unit and said film unit;

a motor;

a coupling mechanism rotatably supported by said film unit; and a strobe unit displaced by a drive force of said motor through said coupling mechanism.

14. A camera according to claim 1 wherein said drive mechanism includes a drive motor mounted within said one of said spool chamber and patrone chamber units and a coupling mechanism mounted on an exterior of said one of said spool chamber and patrone chamber units.

15. A camera according to claim 12 wherein said first urging means directly urges the strobe main body unit towards a closed position a lever pivoted to rotate about an axis intermediate first and second ends thereof said first end being urged by said second urging means when said locking means unlocks said second urging means to cause said second lever end to engage said strobe main unit and move said strobe main unit to the flash photographing position against the force of said first urging means.

16. A camera according to claim 12 wherein said first and second urging means are torsion springs.

17. A camera according to claim 16 wherein said torsion springs each have on end fixed to the camera body and an opposite end for providing an urging force.

18. A camera comprising:

a camera main body constituted by integrally coupling a plurality of independent units including at least a lens barrel unit, a spool chamber unit, and a patrone chamber unit, said units being integrally coupled by fasteners to releasable join said units to facilitate service, repair and replacement of said units:

a strobe light emitter mounted on said camera main body and being movable between a light emission possible position for projecting light during a photographing operation and an accommodating position where it is accommodated within said camera main body;

a motor and a drive mechanism directly coupled between said motor and said strobe light emitter and being driven by said motor for driving said strobe light emitter.

19. A camera according to claim 18 wherein said motor drives at least one driven part of said camera through a second drive mechanism in addition to driving said strobe light emitter.

20. A camera according to claim 18 wherein said motor drives at least one of said lens barrel unit, a film loaded in said patrone chamber unit and a finder unit provided in said camera through a further drive mechanism for the unit being driven in addition to driving said strobe light emitter.

* * * * *

UNITED STATES PATENT AND TRADEMARK OFFICE
CERTIFICATE OF CORRECTION

PATENT NO.  : 5,999,750
DATED       : December 7, 1999
INVENTOR(S) : Yamada et al It is certified that error appears in the above-identified patent and that said Letters Patent is hereby corrected as shown below:

Column 5,
Line 62, delete the word "tightened" and insert therefor --secured--.

Column 10,
Line 48, delete the word "are" and insert therefor --and--.

Column 13,
Line 13, delete the word "different" and insert therefor --from--.

Signed and Sealed this

Thirty-first Day of July, 2001

*Attest:*

*Nicholas P. Godici*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.   : 5,999,750
DATED        : December 7, 1999
INVENTOR(S)  : Yamada et al.

It is certified that error appears in the above-identified patent and that said Letters Patent is hereby corrected as shown below:

<u>Column 13,</u>
Line 13, replace the words "different each" with -- different from each --.

Signed and Sealed this

Thirteenth Day of August, 2002

*Attest:*

*Attesting Officer*

JAMES E. ROGAN
*Director of the United States Patent and Trademark Office*